June 1, 1948. W. L. GOULD 2,442,562
FILM ADJUSTMENT SIGNAL DEVICE
Filed March 28, 1945
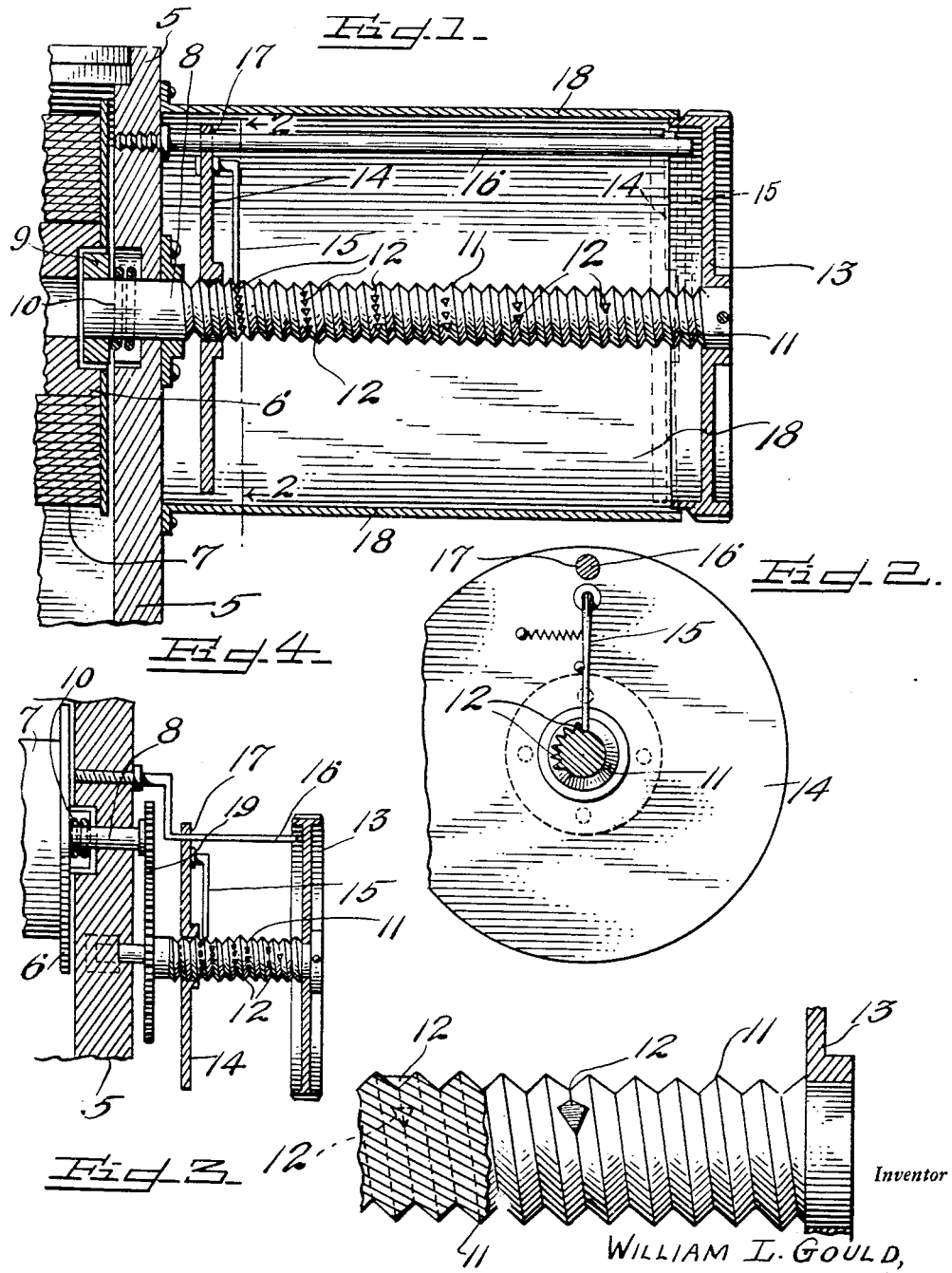
Inventor
WILLIAM L. GOULD,
By Clarence A. O'Brien
and Harvey B. Jacobson
Attorneys Patented June 1, 1948

2,442,562

UNITED STATES PATENT OFFICE 2,442,562

FILM ADJUSTMENT SIGNAL DEVICE

William L. Gould, Albany, N. Y.

Application March 28, 1945, Serial No. 585,305

6 Claims. (Cl. 242—71)

This invention relates to a signal device for roll-film holding cameras, and has more particular reference to such a device embodying means to audibly advise the user of the camera when an unexposed portion of the film has been brought into proper position for exposure.

An important object of the present invention is to provide a device of the above kind which will overcome the necessity of changing the position of the camera each time the film is adjusted and as is required in connection with ordinary cameras having means to visually indicate when the new or unexposed portion of the film has been brought into position for exposure.

A further object of the invention is to provide a device of the above kind which will audibly advise the user of the camera as to the number of the unexposed film portion which has been brought into position for exposure.

Still another object of the invention is to provide a device of the above kind which is comparatively simple in construction, efficient in operation, and readily adaptable to the operating shaft for the take-up roller or film-receiving reel of the camera.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary vertical section through a portion of a camera equipped with a signal device embodying the present invention.

Figure 2 is a fragmentary section taken on line 2—2 of Figure 1, partly broken away.

Figure 3 is an enlarged fragmentary view, partly in elevation and partly in section, more clearly illustrating the construction of the feed screw forming part of the device shown in Figure 1.

Figure 4 is a view similar to Figure 1, drawn on a smaller scale, illustrating a modification of the invention.

Referring in detail to the drawings, 5 indicates the casing of an ordinary roll-film holding camera, and 6 indicates the take-up roller or film-receiving reel of the camera onto which the film 7 is wound from a supply roller or reel, as is well known in the art. As is generally old in the art, an operating shaft 8 is provided for the roller or reel 6, the shaft 8 being rotatably and slidably mounted in the adjacent side wall of the camera casing 5, means 9 being provided to clutch the inner end of the shaft 8 to the roller or reel 6, and such clutching means being normally engaged by means of a spring 10. As is also conventional, the shaft 8 is slid outwardly to disengage the clutching means 9 and permit removal of the roller or reel 6 from the camera casing so that a different empty roller or reel may be substituted therefor when an entire film has been used.

In accordance with the present invention, an adjusting screw or threaded shaft 11 is operatively connected to the shaft 8 and formed with a coarse thread, as shown in Figure 3. Inwardly of the valley of the thread of screw 11, at properly spaced points, said screw is notched to provide dam-like lugs 12. Secured on the outer end of the screw or threaded shaft 11 is an operating wheel or knob 13 preferably having a knurled periphery to facilitate gripping the same. A nut member or disc 14 is adjustably threaded on the screw 11 and has a yieldable pawl or finger 15 pivoted thereto and disposed to project toward the screw 11 with its free end riding in the valley of the thread of screw 11. The arrangement is such that the lugs 12 will be in the path of the free end of pawl or finger 15.

Rigid with and projecting outwardly from the casing 5 to adjacent the periphery of the knob 13, and extending parallel to the screw 11, is a rod 16 that slidably projects through an aperture 17 of the nut member or disc 14. Thus, when knob or disc 13 is turned to rotate screw 11 and shaft 5 and thereby effect winding of the film onto the roller or reel 6, rod 16 prevents rotation of disc 14, but permits travel of the latter longitudinally of the screw 11 due to threaded engagement of said nut or disc member 14 with the screw 11. The points at which the lugs 12 are located are progressively spaced a lesser distance apart in the direction in which the nut member 14 travels when the film is wound upon the roller 6, because a lesser degree of turning of the worm 11, shaft 8 and roller 6 is progressively required to bring a new portion of the film in position for exposure, as the amount of film on the roller 6 increases. The arrangement is such that the nut member 14 is moved until the first lug 12 of screw 11 clicks past the pawl 15 when the No. 1 portion of the film has been brought into position for exposure, the nut member 14 will be adjusted so that the second lug or set of lugs 12 will click past pawl 15 when the No. 2 portion of the film has been brought into position for exposure, and so on. By progressively increasing the number of lugs 12 provided at the spaced points along the screw 11, from 1 to 6, inclusive, a clicking noise or clicking noises will be made to correspond to the number of the film portion brought into position for exposure. For instance, when the No. 1 portion of the film is brought into position for exposure, a single lug 12 will click past pawl 15, when the No. 2 portion of the film is brought into position for exposure, two adjacent lugs 12 click past pawl 15, and so on. In this way, the clicking sounds provide an audible indication of the fact that the next film portion has been brought into position for exposure and an indication as to the number of that film portion. In this way, the user will know when the last film portion has been exposed and when it is necessary to remove the used film and insert a new or unused one within the camera.

In the embodiment of Figure 1, the screw 11 is in the form of an integral extension of the shaft 8, and the parts 11, 14 and 16 may be suitably encased, as at 18.

In the form of the invention shown in Figure 4, the screw 11 is separate from the shaft 8 and is operatively connected to the latter by means of an increase speed gearing 19 so that slight turning movement of screw 11 will effect a greater degree of turning of shaft 8 and roller 6. The advantage of the arrangement of Figure 4 is that the screw 11 may be of shorter length than with the arrangement of Figure 1 so that the parts will not project as far from the side of the camera casing. Also, in this embodiment, the rod 16 is offset to provide clearance for the gear on the shaft 8 and to permit sufficient movement of the shaft 8 outwardly to unclutch the same from the roller 6 when removing a filled roller or inserting an empty one. Otherwise, the embodiments of Figure 1 and 4 are essentially the same, and corresponding parts of both forms are indicated by like reference characters.

In use, worm 11 and shaft 8 are rotated so as to move the nut member or disc 14 to the right hand end of screw 11, as indicated by dotted lines in Figure 1. Assuming that the shaft 8 is clutched to the roller 6, screw 11 is then rotated in the opposite direction by actuating knob 13 until the first or single lug 12 near the right hand end of the screw 11 clocks past pawl 15, as shown in Figures 1 and 4. When this has occurred, the first portion of the film will have been moved into proper position for exposure. The next film portion is brought into proper position for exposure by repeating this operation until the next set of two lugs 12 click past pawl 15. This apprises the user that No. 2 film portion has been moved into proper position, and the same operation is repeated until the nut member 14 reaches the full line position of Figure 1 to bring the last film portion in position for exposure. When this is done, a number of lugs 12 corresponding to the number of the film portion click past pawl 15, and the user will know that the last film portion is ready for exposure. As an audible signal is given to indicate that the film portion is in position for exposure and to indicate the number of such film portion, the position of the camera need not be disturbed to determine these facts as often required by visual indicators. Of course, the nut member or disc 14 is preferably set in its starting position by rotating the screw 11 in one direction while there is no receiving roller in the camera, the shaft 8 being clutched to a receiving roller subsequently inserted in the camera so that subsequent reverse rotation of screw 11 will effect the desired operation. To unclutch the shaft 8 from the roller 6, it is simply necessary to pull outwardly on the knob 13 and thereby slide the screw 11 and shaft 8 outwardly against the action of spring 10, in connection with the form of Figure 1. Relative to the form of Figure 4, the gear of shaft 8 is grasped to slide said shaft outwardly and thereby unclutch the shaft 8 from the roller 6. As soon as the knob 13 of Figure 1, or the gear of shaft 8 in Figure 4, is released, shaft 8 will be slid inwardly by spring 10 to clutch shaft 8 to the receiving roller of the camera. It is of course necessary that the first lug 12 be positioned so that it will be engaged by a pawl 15 after the backing strip on the beginning of the roll of film has been rolled up on the take-up spool and the first portion of the film has been drawn into position for exposure. Likewise, it is necessary that the disc 14 be permitted sufficient movement after exposure of the last film portion to allow the backing strip on the end of the film to be rolled up on the take-up spool.

From the foregoing description, it is believed that the construction and operation, as well as the advantages of the present invention, will be readily understood and appreciated by those skilled in the art. Minor changes may be made in details of construction illustrated and described, such as fall within the spirit and scope of the invention as claimed.

What I claim is:

1. In combination with the operating shaft for the film take-up roller of a camera, a rotary adjusting screw operatively connected to said shaft and having an operating knob, said adjusting screw having dam-like lugs in the valley of the thread thereof at spaced points along the length of the screw, a nut member adjustably threaded on said screw and carrying a yieldable pawl, said pawl having a free end riding in the valley of the screw thread so as to click over said lugs, said spaced points being such that the clicking of the pawl will occur each time a new film portion is brought into position for exposure by rotating the screw, and means to restrain the nut member against rotation without interfering with movement of the same longitudinally of the screw.

2. In combination with the operating shaft for the film take-up roller of a camera, a rotary adjusting screw operatively connected to said shaft and having an operating knob, said adjusting screw having dam-like lugs in the valley of the thread thereof at spaced points along the length of the screw, a nut member adjustably threaded on said screw and carrying a yieldable pawl, said pawl having a free end riding in the valley of the screw thread so as to click over said lugs, said spaced points being such that the clicking of the pawl will occur each time a new film portion is brought into position for exposure by rotating the screw, and means to restrain the nut member against rotation without interfering with movement of the same longitudinally of the screw, the number of lugs at said spaced points progressively increasing in a given direction so as to provide for production of a number of clicking noises corresponding to the number of the film portion brought into position for exposure.

3. In combination with the operating shaft for the film take-up roller of a camera, a rotary adjusting screw operatively connected to said shaft and having an operating knob, said adjusting screw having dam-like lugs in the valley of the thread thereof at spaced points along the length of the screw, a nut member adjustably threaded on said screw and carrying a yieldable pawl, said pawl having a free end riding in the valley of the screw thread so as to click over said lugs, said spaced points being such that the clicking of the pawl will occur each time a new film portion is brought into position for exposure by rotating the screw, and means to restrain the nut member against rotation without interfering with movement of the same longitudinally of the screw, said operating shaft being longitudinally slidable to clutch or unclutch the same from the take-up roller, the operative connection between the screw and said operating shaft including an increase speed gearing permitting longitudinal sliding movement of the operating shaft relative to the screw.

4. In combination with the operating shaft for the film take-up roller of a camera, a rotary adjusting screw operatively connected to said shaft and having an operating knob, said adjusting screw having dam-lugs in the valley of the screw, a nut member adjustably threaded on said screw and carrying a yieldable pawl, said pawl having a free end riding in the valley of the screw thread so as to click over said lugs, said spaced points being such that the clicking of the pawl will occur each time a new film portion is brought into position for exposure by rotating the screw, and means to restrain the nut member against rotation without interfering with movement of the same longitudinally of the screw, said lastnamed means comprising a rod parallel with the screw and mounted in a fixed position, said nut member having an aperture through which said rod slidably extends.

5. In a camera, the combination with a film take-up roller, of manipulable means for turning said roller to move successive zones of said film into proper position for exposure, and means cooperating with said manipulable means for producing an audible signal when each successive zone of said film has been moved into such position; each signal having distinctive characteristics by means of which the successive zones of said film may be identified as they move into exposure position.

6. In a camera, the combination with a film take-up roller, of manipulable means for turning said roller to move successive zones of said film into proper poistion for exposure, and means cooperating with said manipulable means for producing an audible signal when each successive zone of said film has been moved into such position; each signal having distinctive characteristics by means of which the successive zones of said film may be identified in numerical order as they move into exposure position.

WILLIAM L. GOULD.

REFERENCES CITED

The following references are of record in the file of this patent:

UNITED STATES PATENTS

| Number  | Name         | Date        |
|---------|--------------|-------------|
| 317,050 | Walker et al. | May 5, 1885 |